May 19, 1925.
L. A. G. ASSELIN
DRAG SAW
Filed June 9, 1922
1,537,980
3 Sheets-Sheet 1
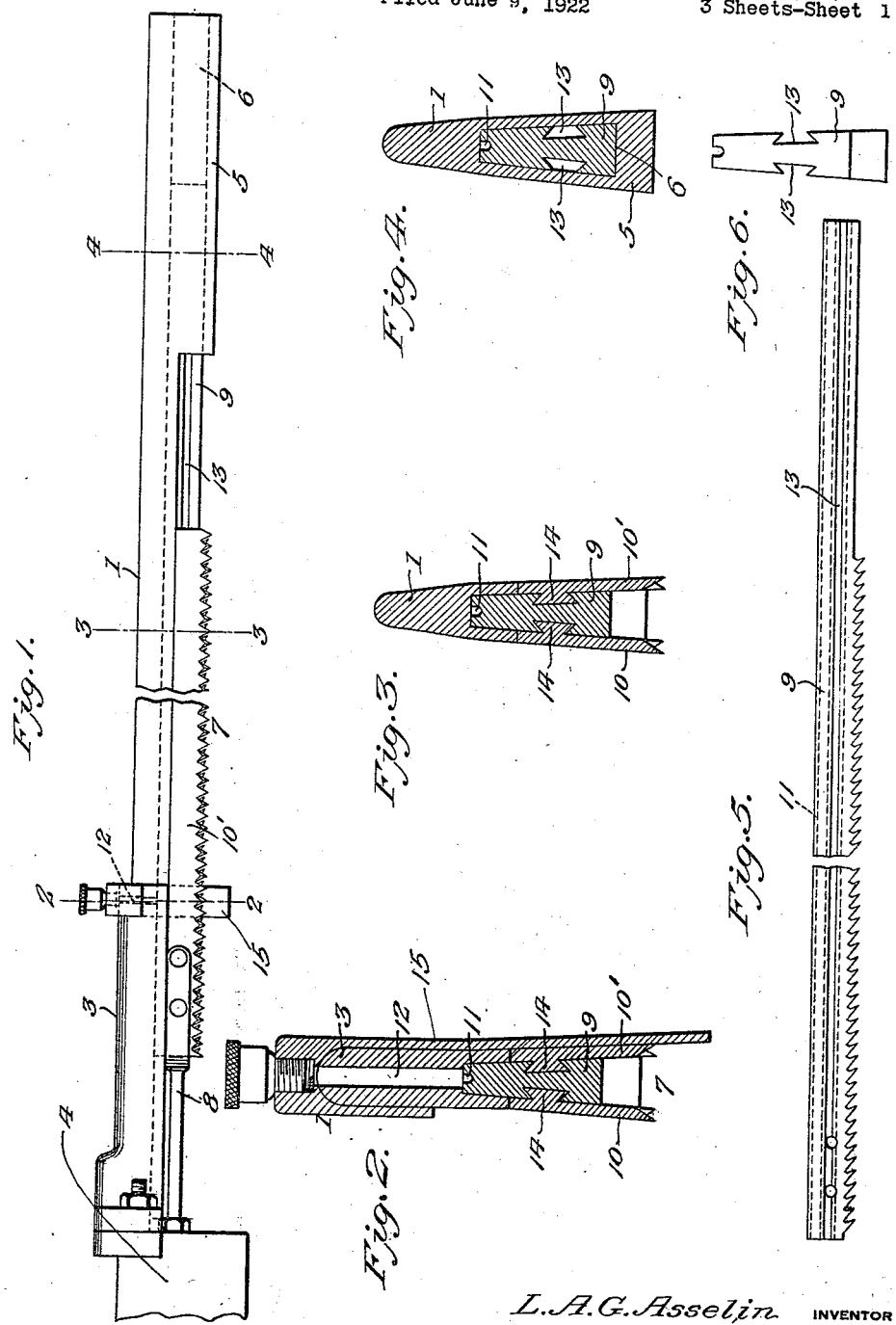
L.A.G. Asselin INVENTOR May 19, 1925.
L. A. G. ASSELIN
1,537,980
DRAG SAW
Filed June 9, 1922
3 Sheets-Sheet 2
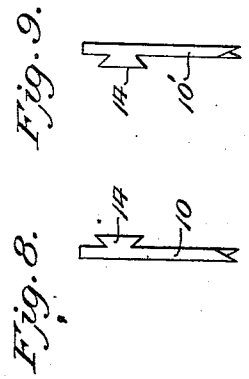
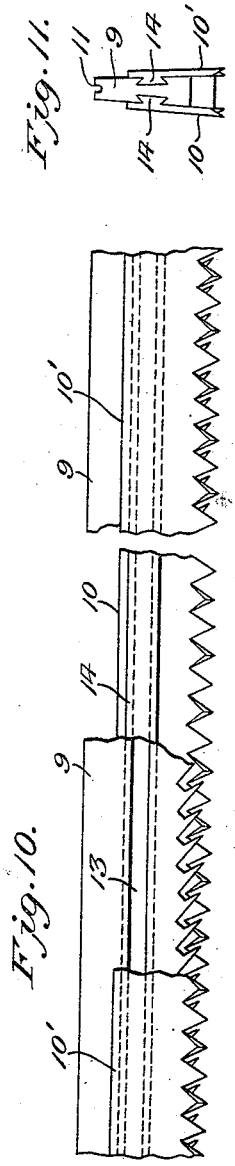
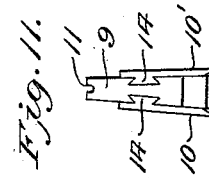
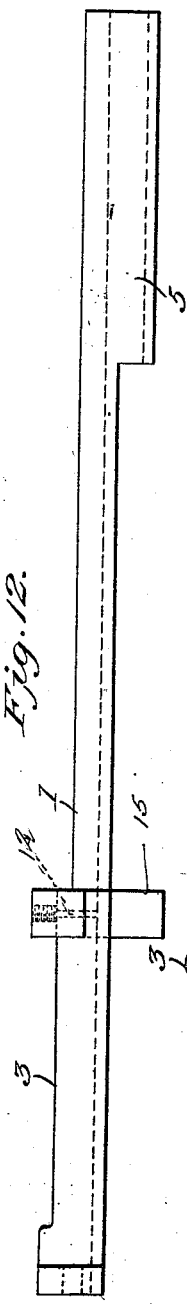
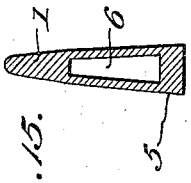
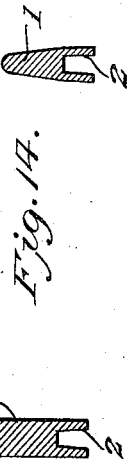
L. A. G. Asselin INVENTOR
BY *Victor J. Evans*
ATTORNEY
WITNESS:

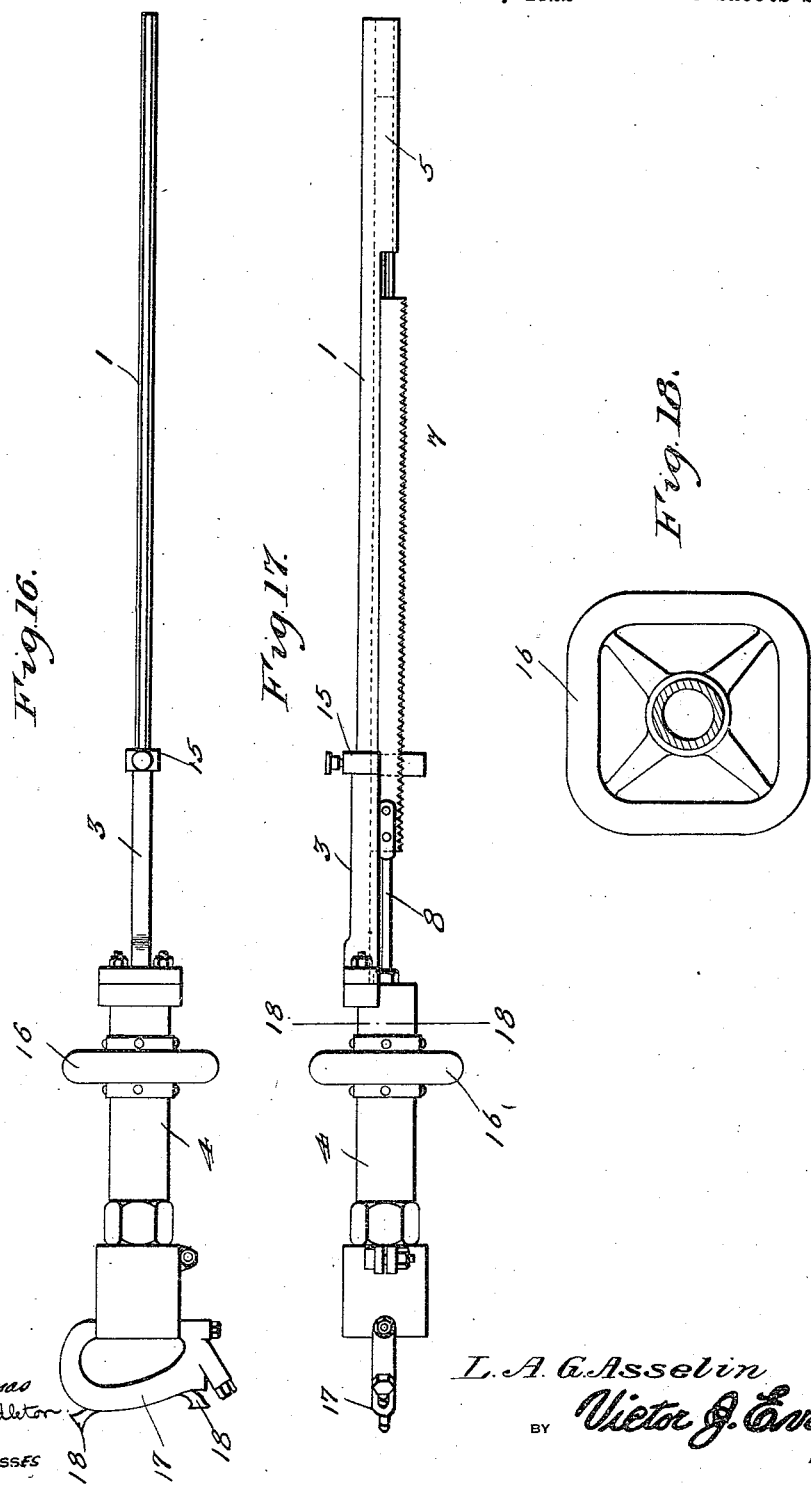

Patented May 19, 1925.

1,537,980

UNITED STATES PATENT OFFICE.

LOUIS A. G. ASSELIN, OF PRINCE ALBERT, SASKATCHEWAN, CANADA.

DRAG SAW.

Application filed June 9, 1922. Serial No. 567,216.

*To all whom it may concern:*

Be it known that I, Louis A. G. Asselin, a subject of the King of Great Britain, residing at Prince Albert, in the Province of Saskatchewan and Dominion of Canada, have invented new and useful Improvements in Drag Saws, of which the following is a specification.

This invention relates to improvements in drag saws, the general object of the invention being to provide a saw of this type of light but strong construction and one which can be easily handled and carried about by one man and without requiring him to move heavy and cumbersome supporting structure every time the saw is to be moved.

Another object of the invention is to provide several blades suitably connected together and provided with different kinds of teeth so that the saw as a whole will quickly cut through the timber, making a cut wide enough to allow the guiding member to follow the saw through the cut.

A still further object of the invention is to provide a stationary guiding member in which the saw reciprocates, the guiding member being so made that it will enter the cut made by the saw and without binding therein.

A still further object of the invention is to provide simple and effective means for holding the several blades comprising the saw together and so that they can be easily separated for sharpening purposes.

A further object of the invention is to provide a stop for limiting the stroke of the saw and handle and throttle means for permitting the saw to be held in different positions.

This invention also consists in certain others features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the complete invention showing a portion of the cylinder and the piston rod.

Figure 2 is a section on line 2—2 of Figure 1.

Figure 3 is a section on line 3—3 of Figure 1.

Figure 4 is a section on line 4—4 of Figure 1.

Figure 5 is an elevation of the central blade.

Figure 6 is an end view of said blade.

Figure 7 is an elevation of one of the side blades.

Figures 8 and 9 are end views of the side blades.

Figure 10 is an elevation of part of the assembled blades.

Figure 11 is an end view of Figure 10.

Figure 12 is an elevation of the guiding member.

Figures 13, 14, and 15 are sectional views of the guiding member.

Figure 16 is a plan view showing the improved saw attached to the power cylinder.

Figure 17 is a side view thereof.

Figure 18 is a section on line 18—18 of Figure 17.

In these views 1 indicates the guiding member which is of tapered shape in cross section and is provided with a tapered groove 2 in its lower edge. The rear end of this member is reinforced, as at 3, and this end is bolted or otherwise secured to the cylinder 4 of the power apparatus. The front end of the guiding member is of much greater width than the rest of it, as shown at 5, and this portion has an opening 6 therein, the upper part of which form a continuation of the groove 2, this opening being of tapered shape and is wider at the bottom than at the top.

The reciprocating saw 7 is bolted to the outer end of the piston rod 8 of the power apparatus and consists of the central blade 9 and the side blades 10 and 10'. The central blade is made longer than the side blades with its front end free of teeth and arranged to engage the opening 6. This central blade is of tapered construction with its small end uppermost and this small end engages the groove 2 in the guiding member 1. This small end of the central blade is provided with the channel 11 for receiving lubricant, the guiding member being provided with one or more holes 12 through which the lubricant is introduced into the channel. Each side of this central blade is provided with a dove-tail shaped groove 13 and each side blade is provided with a dove-tail shaped projection 14 for engaging said groove. Thus the side blades will be secured to the central blade by a tongue and groove connection and the parts are securely held together by the bolts which connect the saw to the piston rod. The parts are so arranged that the upper edges of the side blades will abut against the lower edge of the guiding member so that play between the saw and guiding member is prevented. The central blade is preferably provided with chisel-shaped teeth and may also be provided with rakers if desired. The side blades are provided with the ordinary cross cutting teeth.

A stationary gauge 15 is suitably secured to the guiding member, for preventing the piston rod from striking the timber when the saw is being used. This gauge is provided with a screw threaded hole for receiving a grease cup and this hole is in communication with the hole 12 so that lubricant can pass from the cup to the channel in the guiding member.

A handle 16 is suitably secured to the cylinder 4 in such a position that it will balance the cylinder and the saw and act to counter balance the drag of the hose which is connected with the cylinder. This handle is formed as shown so as to provide four hand engaging parts which are 90° from each other so that the device can be handled in any position with ease. To permit this easy handling of the device I also provide the back handle 17 with two throttle operating buttons 18 which are arranged as shown.

It will thus be seen that when compressed air or the like is introduced into the cylinder the saw will be reciprocated in the guiding member so that it is simply necessary to press the device against the work to cause the saw to cut into the same. As the toothed part of the saw is of greater width than the rest thereof the device will pass into the cut and there is no danger of it binding therein and the entire device can easily be removed from the cut whenever desired. The cylinder may be of the riveter type and it may be connected with the supply of compressed air by a small hose so that the device can be easily handled by one man and he can fell trees and cut logs and the like without having to move a lot of machinery or supporting structure as is necessary in the drag saws now in use.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A saw of the class described comprising a guiding frame of tapered shape in cross section having a guiding groove in its wide edge and having a wide outer part having an opening therein, the upper part of which forms a continuation of the groove, a saw also of tapered shape in cross section having its upper edge fitting in said guiding groove and an end extension engaging the opening and means for reciprocating the saw in the frame.

In testimony whereof I affix my signature.

LOUIS A. G. ASSELIN.